United States Patent [19]

Agarwal et al.

[11] 4,411,668

[45] Oct. 25, 1983

[54] LIQUID DYESTUFF PREPARATIONS

[75] Inventors: Suresh C. Agarwal, Bottmingen; Horst Jäger, Bettingen; Nitya G. Podder, Duggingen; Hans Mollet, Reinach, all of Switzerland

[73] Assignee: Ciba-Geigy Corporation, Ardsley, N.Y.

[21] Appl. No.: 340,685

[22] Filed: Jan. 20, 1982

[30] Foreign Application Priority Data

Jan. 26, 1981 [CH] Switzerland .......................... 473/81

[51] Int. Cl.³ .................... C09B 67/18; C09B 67/40; D06P 1/645
[52] U.S. Cl. ............................................ 8/527; 8/604
[58] Field of Search ................................ 8/527, 604

[56] References Cited

U.S. PATENT DOCUMENTS

| | | | |
|---|---|---|---|
| 3,705,043 | 12/1972 | Zabiak | 106/20 |
| 4,136,039 | 1/1979 | Jäger et al. | 252/8.8 |
| 4,153,593 | 5/1979 | Zabiak et al. | 106/22 |
| 4,225,311 | 9/1980 | Niimi et al. | 8/524 |
| 4,299,630 | 11/1981 | Hwang | 106/22 |

FOREIGN PATENT DOCUMENTS 2850482  5/1979  Fed. Rep. of Germany .

*Primary Examiner*—Maria Parrish Tungol
*Attorney, Agent, or Firm*—Edward McC. Roberts

[57] ABSTRACT

The invention relates to dyestuff preparations comprising water, a water-insoluble or sparingly water-soluble dye, a dispersant, a humectant, and optionally further additives, wherein said humectant is a compound of the formula I

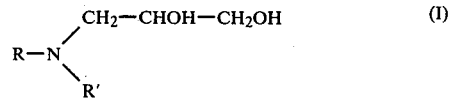

wherein R is a $C_1$–$C_{16}$ alkyl group which is unsubstituted or substituted by OH, CN, halogen or —N($C_1$–$C_4$alkyl)$_2$, and R' is hydrogen or the —$CH_2$—CHOH—$CH_2$OH group.

These preparations are suitable for use in aqueous or aqueous-organic dye liquors or printing inks or also for obtaining printing pastes. After partial or complete dehydration they are also very readily redispersible.

12 Claims, No Drawings

LIQUID DYESTUFF PREPARATIONS

The present invention relates to liquid dyestuff preparations of water-insoluble or sparingly water-soluble dyes, to a process for their production, and to their use for dyeing or printing textile material.

A very considerable number of liquid dyestuff preparations of water-insoluble or sparingly water-soluble dyes are already known (q.v. for example German Offenlegungsschrift No. 2 850 482). They consist generally of water, dye, dispersants, antifreeze agents and humectants, as well as further additives, e.g. extenders, microbicides or antifoams. The antifreeze agents and humectants employed in these preparations are usually polyalcohols such as glycerol, sorbitol, ethylene glycol or propylene glycol.

These preparations, however, often have insufficient redispersibility, i.e. if their water content has partially or completely evaporated they do not give good dispersions when this water content is replaced. Dyestuff agglomerates are formed and/or crystallisation occurs and it is not possible to filter the preparations without a residue remaining on the filter.

It is the object of the present invention to provide aqueous preparations of water-insoluble or sparingly water-soluble dyes, which preparations have improved redispersibility.

This object is accomplished by means of the preparations of the invention. The preparations still have excellent redispersibility after desiccation at 60° C. When the evaporated water content is added again, it suffices to stir the suspension for a time in order to obtain a dispersion which can be filtered without leaving a residue. Complicated grinding procedures are not necessary.

Accordingly, the present invention provides liquid dyestuff preparations comprising water, a water-insoluble or sparingly water-soluble dye, a dispersant, a humectant, and optionally further additives, wherein said humectant is a compound of the formula I

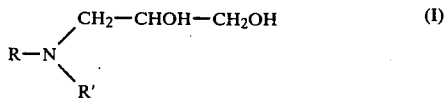

wherein R is a $C_1$-$C_{16}$alkyl group which is unsubstituted or substituted by OH, CN, halogen or —N($C_1$-$C_4$alkyl)$_2$, and R' is hydrogen or the —$CH_2$—$CHOH$—$CH_2OH$ group.

The alkyl group R may be straight chain, branched or cyclic. Examples of suitable alkyl groups are: methyl, ethyl, n-propyl, isopropyl, n-butyl, isobutyl, sec-butyl, tert-butyl, n-pentyl, neopentyl, octyl, dodecyl, tetradecyl, hexadecyl, cyclopentyl, cyclohexyl or cycloheptyl.

Examples of alkyl groups substituted by OH, CN, halogen such as fluorine, chlorine, bromine or iodine, or also by —N($C_1$-$C_4$alkyl)$_2$ are: β-hydroxyethyl, β-cyanoethyl, mono-, di- or perfluoroethyl, β,γ-dichloropropyl, γ-hydroxypropyl, β-(N,N-diethylamino)ethyl or γ-(N,N-dimethylamino)propyl.

Particularly useful humectants are those in which R is an unsubstituted alkyl group of 1 to 8, preferably 2 to 4, carbon atoms, and in which R' is the —$CH_2$—$CHOH$—$CH_2OH$ group.

The dyestuff preparations of the invention preferably comprise 15 to 60% by weight of dye, 20 to 60% by weight of water, 10 to 50% by weight of humectant of the formula I, 0.5 to 10% by weight of dispersant and 0 to 20% by weight of further additives.

Suitable water-insoluble or sparingly water-soluble dyes are, in particular, disperse dyes and vat dyes. The dyes belong to different classes. The disperse dyes are e.g. nitro dyes, aminoketone dyes, ketone-imine dyes, methine dyes, nitrodiphenylamine dyes, quinoline dyes, aminonaphthoquinone dyes, coumarin dyes and especially anthraquinone dyes, and azo dyes, such as monoazo and disazo dyes.

Vat dyes used are e.g. indigoid dyes, anthraquinoid dyes, for example indanthrene, and also sulfur dyes and leuco vat dye esters.

Dyes will also be understood as comprising fluorescent whitening agents. The latter are e.g. fluorescent whitening agents which are water-insoluble or sparingly water-soluble and belong to the following classes of compounds: stilbenes, coumarins, benzocoumarins, pyrenes, pyrazines, pyrazolines, oxazines, mono- or dibenzoxazolyl or dibenzimidazolyl compounds, aryltriazole and v-triazole derivatives as well as naphthalimides.

It is also possible to use mixtures of the same or different types of dye and also fluorescent whitening agents as defined above in the aqueous preparations.

As dispersants it is preferred to use anionic and/or non-ionic dispersants.

Examples of non-ionic dispersants are:

Adducts of e.g. 5 to 500 moles of alkylene oxides, in particular ethylene oxide, with fatty acids or with saturated or unsaturated alcohols, mercaptans or amines containing 8 to 20 carbon atoms, or with alkyl phenols or alkylthiophenols, the alkyl moieties of which contain at least 7 carbon atoms, the individual ethylene oxide units of which adducts may be replaced by substituted epoxides such as styrene oxide and/or propylene oxide.

Reaction products of fatty acids of higher molecular weight and hydroxylalkylamines. These reaction products may be prepared e.g. from fatty acids of higher molecular weight, preferably those containing about 8 to 20 carbon atoms, e.g. caprylic acid, stearic acid, oleic acid and, in particular, the mixture of acids collectively known as "coconut oil fatty acid", and hydroxyalkylamines such as triethanolamine or preferably diethanolamine, as well as mixtures of these amines, the reaction being conducted such that the molecular ratio of hydroxyalkylamine to fatty acid is greater than 1, e.g. 2:1. Such compounds are described in U.S. Pat. No. 2 089 212.

Phenol ethers such as p-nonyl phenol etherified with 9 moles of ethylene oxide; and esters of ricinolic acid etherified with 15 moles of ethylene oxide and hydroabietyl alcohol etherified with 25 moles of ethylene oxide.

Fatty alcohol polyglycol ethers are particularly advantageous, especially those with 20 to 100 moles of ethylene oxide, such as stearyl-oleyl alcohol etherified with 80 moles of ethylene oxide, and oleyl alcohol etherified with 20 to 80 moles of ethylene oxide, but preferably cetyl-stearyl alcohol etherified with 20 to 30 moles of ethylene oxide.

Also preferred are alkylene oxide condensation products, especially ethylene oxide condensation products, individual ethylene oxide units of which may be replaced by substituted epoxides such as styrene oxide and/or propylene oxide.

Particularly preferred are the copolymers of ethylene oxide and propylene oxide of the formula

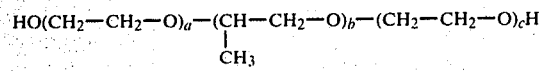

wherein the sum of a and c is an integer from 100 to 400 and b is an integer from 30 to 80. These non-ionic dispersants should preferably have a low content of electrolytes. Mixtures of such compounds are also possible.

Suitable anionic dispersants for the preparations of the invention are anionic dispersants ordinarily employed for disperse or vat dyes. It is preferred to use the following compounds:

(a) Lignosulfonates, for example those which are obtained by the sulfite process or kraft process. These are preferably products which are partially hydrolysed, oxidised or desulfonated and have been fractionated by known processes, for example in accordance with the molecular weight or with the degree of sulfonation. Mixtures of sulfite- and kraft-lignosulfonates are also very effective. Particularly suitable lignosulfonates are those having an average molecular weight between 1,000 and 80,000, an active lignosulfonate content of at least 80% and preferably a low content of polyvalent cations. The degree of sulfonation can vary within wide limits. The ratio of carbon to organically bonded sulfur is e.g. from 9:1 to 55:1.

(b) Condensation products of aromatic sulfonic acids with formaldehyde, such as condensation products of formaldehyde and naphthalenesulfonic acids, or from formaldehyde, naphthalenesulfonic acid and benzenesulfonic acid, or a condensation product of crude cresol, formaldehyde and naphthalenesulfonic acid.

(c) Dialkylsulfosuccinates, the alkyl moieties of which each contain 3 to 8 carbon atoms, e.g. dipropylsulfosuccinate, diisobutylsulfosuccinate, diheptylsulfosuccinate, but preferably dihexylsulfosuccinate and diamylsulfosuccinate.

(d) Sulfated or sulfonated fatty acids or fatty acid esters of fatty acids containing 10 to 22, preferably 12 to 18, carbon atoms, e.g. sulfated oleic acid, elaidic acid or ricinolic acid or the lower alkyl esters thereof, e.g. the ethyl, propyl or butyl esters. The sulfated or sulfonated oils which contains such fatty acids, e.g. olive oil and, in particular, castor oil, are also very suitable.

These anionic dispersants are preferably used in the form of their ammonium salts or, in particular, alkali salts such as lithium, potassium or, preferably, sodium salts.

If desired, further substances which improve the characteristics may be added to the dyestuff preparations, e.g. extenders such as dextrin or sorbitol, hydrotropic agents such as urea or formamide, microbicides, fungicides, e.g. aqueous formalin solution, antifoams and viscosity improvers, e.g. polysaccharides.

Dyestuff preparations with particularly good redispersibility are those which contain 15 to 60% by weight, preferably 35 to 50% by weight, of dye, 20 to 60% by weight of water, 10 to 50% by weight, preferably 15 to 30% by weight, of the humectant of formula 1, 0.1 to 5% by weight of an anionic dispersant, 0.5 to 5% by weight of a non-ionic copolymer of ethylene oxide and a further olefin oxide containing at least 65% by weight of ethylene oxide and having a molecular weight of more than 12000, and optionally further additives. Further preparations with particularly good redispersibility are those which contain 15 to 60% by weight, preferably 35 to 50% by weight, of dye, 20 to 60% by weight of water, 10 to 50% by weight, preferably 15 to 30% by weight, of the humectant of formula I, 0.5 to 5% by weight, preferably 1 to 4% by weight, of a non-ionic dispersant, and 0.5 to 5% by weight, preferably 1 to 3% by weight, of an anionic dispersant selected from the group consisting of the (a) dialkylsulfosuccinates, the alkyl moieties of which each contain 3 to 8 carbon atoms, or of the (b) sulfated or sulfonated fatty acids or fatty acid esters of fatty acids containing 10 to 22 carbon atoms, the preferred anionic dispersants being those of group (a), and optionally further additives.

The novel aqueous dyestuff preparations are obtained by mixing and grinding the dye in water with at least one dispersant, e.g. in a ball mill or sand mill, and adding the other components before, during or also after the grinding operation.

As the preparations of the invention have a low content of electrolytes, thickeners which are sensitive to electrolytes can also be used for obtaining printing pastes. In this connection, polyacrylic thickeners are especially useful. In addition, however, natural thickeners are also suitable for the production of printing pastes using the preparations of the invention.

The novel dyestuff preparations are mobile dispersions which have a low dispersant and low electrolyte content, and are finely dispersed and stable in dispersion, i.e. they do not aggregate, have a high concentration of dye and are readily redispersible. They remain stable both during prolonged storage at 25° C. to 30° C. and also after storage for several weeks at 60° C., i.e. they are of low viscosity, they can be filtered with ease and their viscosity changes only to an insignificant degree. The fine dispersion of the dyes remains virtually unchanged during storage. The novel preparations can be dispersed speck-free in textile printing inks with all conventional thickeners. Surprisingly, residues of the liquid dyestuff preparations which may dry at the edge or on the covers of storage containers can be completely redispersed again without the formation of large agglomerates of dye.

The novel aqueous dyestuff preparations are used for preparing aqueous or aqueous-organic dye liquors or printing inks, or those based on a water-in-oil emulsion, and also for preparing printing pastes which contain natural or synthetic thickeners. If the printing pastes or dye liquors contain preparations of the invention based on disperse dyes, then they are used for dyeing or printing cellulosic material, especially cotton.

The printing inks, printing pastes or dye liquors which contain preparations of this invention based on disperse dyes are suitable for dyeing or printing organic material, especially synthetic textile material, by a continuous or discontinuous procedure, for example material made from cellulose triacetate, synthetic polyamides and, in particular, polyester. The dyeings can be obtained by dyeing, padding or printing methods. The additives employed in these methods are those ordinarily used when applying disperse dyes to synthetic material. The materials can be in the most diverse stages of processing.

The dyestuff preparations of this invention which contain transferable dyes can also be used for printing planar structures by transfer printing.

If the novel preparations contain fluorescent whitening agents, they are used for whitening textile materials e.g. by the exhaust method, high temperature exhaust method and pad-heat method. If desired, further suitable dispersants or other assistants may be added in order to stabilise the liquor and/or to obtain carrier effects.

The following Examples illustrate the invention without implying any restriction to what is disclosed therein. Parts and percentages are by weight.

EXAMPLE 1

45.4 g of the dye of the formula

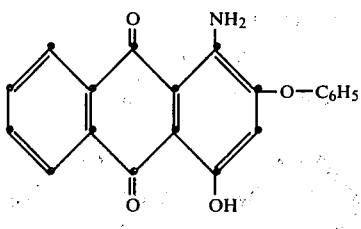

2 g of a block polymer of 20% of propylene oxide and 80% of ethylene oxide (mol. wt. about 16,500), 0.1 g of a lignosulfonate, 18.5 g of water and 10 g of the humectant of the formula

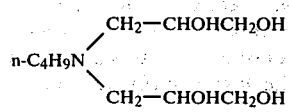

are ground for 24 hours in a mill with 180 g of 1 mm glass beads to a particle size of about 1 μm. Then an additional 3 g of block polymer, 10 g of humectant, 10 g of water and 0.7 g of formalin are added and the resultant fine dispersion is separated from the beads.

This preparation is particularly suitable for transfer printing and in this case e.g. strongly colored prints on polyester fabric are obtained.

REDISPERSIBILITY TEST 1 g of the above dispersion is weighed into a 250 ml glass beaker, the bottom of which has a diameter of 6.5 cm, and the dispersion is distributed over the bottom. The beaker is left to stand uncovered in a laboratory for 72 hours at 24°–27° C. and 40–50% relative humidity. Then 100 ml of water are poured into the beaker, the contents are stirred for 3 minutes with a magnetic rod, and the resultant dispersion is filtered in vacuo through a Schleicher-Schüll SS 597 filter paper. The filtration time of the dispersion is 5 to 8 seconds and no residue remains on the filter paper. The product therefore has good redispersibility.

COMPARISON EXAMPLE

The procedure of Example 1 is repeated, except that the humectant is replaced by the same amount of propylene glycol. The redispersibility test described above is then carried out. After dehydration, the formulation cannot be redispersed and the resultant dispersion cannot be filtered.

EXAMPLE 2

45.4 g of the dye used in Example 1, 19.5 g of water, 20 g of the humectant used in Example 1, 3 g of the block polymer used in Example 1 and 1.25 g of sodium dihexylsulfosuccinate (80% solution in alcohol), are finely ground as described in Example 1 (particle size about 1 μm). Then 10 g of water are added and the dispersion is separated from the beads. The redispersibility test of Example 1 is carried out with 1 g of this dispersion. After dehydration, the formulation is readily redispersible, i.e. it can be filtered without leaving any residue.

This preparation is particularly suitable for transfer printing and in this case e.g. strongly colored prints on polyester fabric are obtained.

COMPARISON EXAMPLE

The procedure of Example 2 is repeated, except that the humectant is replaced by the same amount of propylene glycol. The redispersibility test described in Example 1 is then carried out. After dehydration, the formulation can no longer be redispersed and the dispersion cannot be filtered.

EXAMPLE 3

43.3 g of the dye of the formula

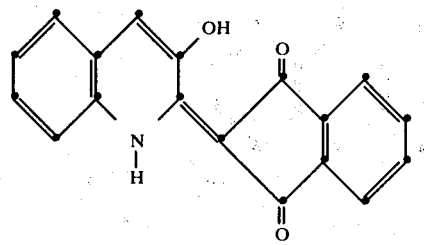

21 g of water, 20 g of the humectant of Example 1, 3.5 g of a block polymer of 20% of propylene oxide and 80% of ethylene oxide (mol. wt. about 16,500) and 1.25 g of sodium dihexylsulfosuccinate (80% solution in alcohol) are finely ground for 24 hours in a bead mill. Then 10 g of water and 0.7 g of formalin are added and the dispersion is separated from the beads.

This preparation is particularly suitable for transfer printing and in this case e.g. strongly colored prints on polyester fabric are obtained.

1 g of this preparation is weighed into a 250 ml glass beaker (diameter of the bottom 6.5 cm) and distributed over the bottom of the beaker. The beaker is then left to stand uncovered for 24 hours at 60° C. and 50% relative humidity. Then 100 ml of water are added to the residual formulation, which is stirred for 3 minutes. The resultant suspension is filtered through a Schleicher-Schüll SS 597 filter paper. The filtration time is about 10 seconds and no residue remains on the filter paper.

EXAMPLE 4

45 g of the dye of the formula

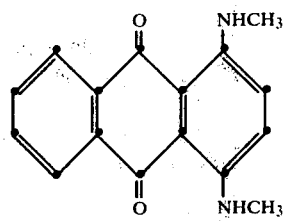

20.4 g of water, 3.5 g of the block polymer of Example 1, 1 g of sodium diamylsulfosuccinate and 10 g of the humectant of Example 1 are ground in a bead mill to a particle size of 1 μm. After about 24 hours, an additional 10 g of water and 10 g of humectant are added and the dye formulation is separated from the beads.

This preparation is particularly suitable for transfer printing and in this case e.g. strongly colored prints on polyester fabric are obtained.

1 g of the above formulation is weighed into a glass beaker and left to stand uncovered for 72 hours at 20°-26° C. Then 100 ml of water are added to the residual formulation and the contents of the beaker are redispersed and filtered. No residue remains on the filter paper, i.e. the product has very good redispersibility.

EXAMPLE 5

39 g of the dye of the formula

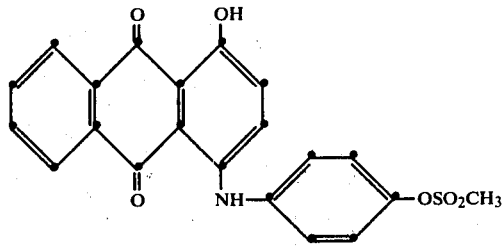

in the form of 67.3 g of filter cake (solids content 58%), 8.9 g of water, 1.6 g of lignosulfonate, 3 g of the block polymer of Example 1, 0.2 g of chloroacetamide, 0.7 g of formalin and 0.3 g of an antifoam are finely ground for 24 hours with glass beads. 18 g of the humectant of Example 1 are added and the preparation is then separated from the glass beads.

This preparation is particularly suitable for direct printing and in this case e.g. a strongly colored and speck-free print on polyester fabric is obtained.

The redispersibility test described in Example 1 is carried out with 1 g of this preparation. The preparation is left to stand uncovered for 4 days at 21°-22° C. The redispersibility is good. The redispersibility is very poor if an equal amount of propylene glycol or ethylene glycol is used instead of the above humectant.

EXAMPLE 6

45 g of the dye used in Example 1, 20 g of water, 20 g of the humectant used in Example 1, 3 g of the block polymer used in Example 1 and 1 g of sodium dihexylsulfosuccinate are finely ground in a mill (particle size <3 μm), giving a dyestuff preparation which has good redispersibility.

This preparation is particularly suitable for transfer printing and in this case e.g. strongly colored prints on polyester fabric are obtained.

EXAMPLE 7

The procedure described in Example 1 is repeated, but using instead a humectant of the formula

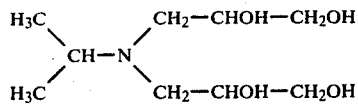

The resultant dyestuff preparation has good redispersibility.

This preparation is particularly suitable for transfer printing and in this case e.g. strongly colored prints on polyester fabric are obtained.

EXAMPLE 8

38.4 g of the dye of the formula

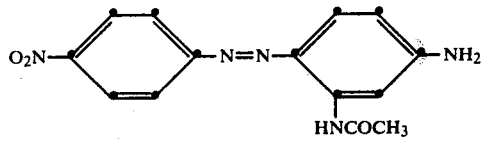

32.2 g of water, 0.1 g of a lignosulfonate, 3 g of a block polymer as used in Example 1 and 20 g of the humectant used in Example 7 are comminuted in a sand mill to a particle size of about 1 μm. The redispersibility test described in Example 1 is carried out with 1 g of this formulation. The formulation has excellent redispersibility.

This preparation is particularly suitable for transfer printing and in this case e.g. strongly colored prints on polyester fabric are obtained.

EXAMPLE 9

48.3 g of the dye of the formula

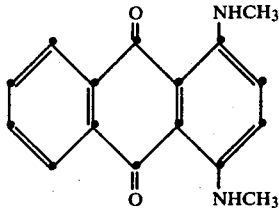

25.3 g of water, 12 g of urea, 2 g of a non-ionic dispersant (condensation product of a $C_{16}$-$C_{18}$n-alkanol with about 25 moles of ethylene oxide), 1.4 g of an anionic dispersant (condensation product of formaldehyde and naphthalenesulfonic acid) and 20 g of the humectant used in Example 7 are ground in a sand mill to a particle size of about 1 μm. The redispersibility of the product is very good.

This preparation is particularly suitable for transfer printing and in this case e.g. strongly colored prints on polyester fabric are obtained.

EXAMPLE 10

311.8 g of a dye filter cake containing 164 g of dye (solids content) of the formula

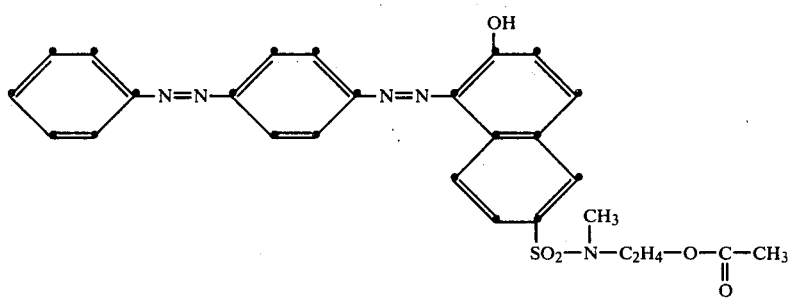

10 g of a block polymer as used in Example 1, 7.5 g of a lignosulfonate, 1 g of an antifoam, 18.2 g of water and 105 g of the humectant used in Example 1 are dispersed and ground for 35 hours with 1250 g of zirconium oxide beads (diameter 0.8–1.7 mm) to a particle size of less than 3 μm. Then an additional 5 g of the block polymer and 1 g of chloroacetamide, 4 g of formaldehyde and 37.5 g of water are added. Grinding is continued for a further 1 hour and then the fine dispersion is separated from the grinding elements. This highly concentrated, finely dispersed preparation with a low content of dispersant is suitable for the preparation of printing pastes using natural and synthetic thickeners. Such printing pastes are suitable for direct printing on polyester materials. The preparation is completely redispersible should it dehydrate in open containers. This property, which has hitherto not been obtained with conventional humectants, can be demonstrated in the following manner and compared with preparations of the known kind, i.e. those containing conventional humectants.

The preparation to be tested is concentrated to dryness for 65 hours at 40° C. in a Petri dish in a drying cabinet. The dry residue is mixed in the desired ratio with a printing thickener based on natural or synthetic thickeners. This printing paste is put into an open film printing screen (mesh 12) and polyester twill printed therewith. The prints are dried and fixed at 170° C. for 8 minutes in a Mathis steamer under HT conditions. Large dyes agglomerates, i.e. non-dispersed dye, are clearly visible in the form of specks. Whereas a print with many large specks, in some cases even with striations, is obtained using a preparation containing propylene glycol as humectant, a completely speck-free print is obtained with the preparations of the invention.

EXAMPLE 11

400 g of demineralised and dried dye of the formula

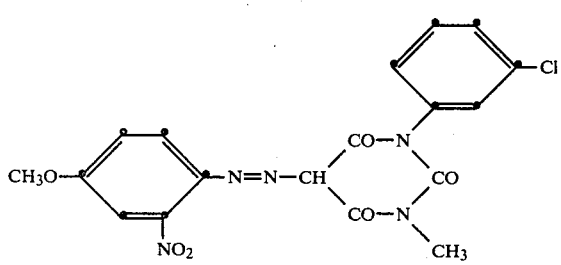

10 g of a block polymer of 20% of propylene oxide and 80% of ethylene oxide (mol. wt. 16,500), 15 g of a lignosulfonate, 5 g of an antifoam, 300 g of water and 170 g of the humectant used in Example 1 are subjected to wet grinding in a ball mill with 2000 g of zirconium oxide grinding elements (diameter 0.8–1.7 mm) for 10 hors until all the dye particles have a size less than 3 μm. To this dispersion are added an additional 20 g of block polymer and also 2 g of chloroacetamide, 7 g of formaldehyde and 71 g of water and the dispersion is well homogenised. The grinding elements are then removed and a fine, mobile dispersion is obtained.

This preparation is particularly suitable for direct printing and in this case e.g. a strongly colored and speck-free print on polyester fabric is obtained.

After it has been dehydrated, the preparation has the same good properties in the redispersibility test as the preparation described in Example 10, i.e. there are no specks on polyester material. On the other hand, a print with many specks is obtained with a preparation which contains propylene glycol as humectant.

EXAMPLE 12

80.4 g of demineralised dried dye of the formula

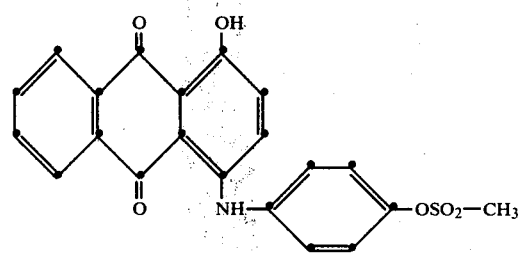

are suspended in a solution of 52 g of water, 36 g of humectant of Example 1, 3.2 g of a lignosulfonate, 0.6 g of antifoam and 6 g of a block polymer of 20% of propylene oxide and 80% of ethylene oxide (mol. wt. about 16,500) and this suspension is then wet ground as in the preceding Examples. A particle size of less than 2 μm is obtained after 16 hours. Then 0.4 g of chloroacetamide, 1.4 g of formaldehyde and 20 g of water are added and the dispersion is ground for a further 5 minutes and then separated through a nylon sieve. After dehydration, the formulation has complete redispersibility.

This preparation is particularly suitable for direct printing and in this case e.g. a strongly colored and speckfree print on polyester fabric is obtained.

EXAMPLE 13

To a solution of 49.5 g of water, 6 g of a lignosulfonate, 1.5 g of an antifoam and 67.5 g of the humectant of Example 1, are added 134 g of a filter cake containing 79 g of a dyestuff mixture consisting of dyes of the formula

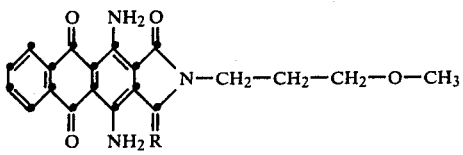

wherein R is oxygen or NH, and the suspension is homogenised. Then a further 9 g of a block polymer as used in Example 1 are added. This suspension is dispersed and ground for 18 hours in a wet grinding mill with 300 g of glass beads (diameter 1 mm) until the particle size is less than 2 μm. After this degree of dispersion has been attained, 0.6 g of chloroacetamide, 2.1 g of formaldehyde and 30 g of water are added. The dispersion is well homogenised and then the grinding elements are separated. The preparation is readily redispersible after dehydration.

This preparation is particularly suitable for direct printing and in this case e.g. a strongly colored and speck-free print on polyester fabric is obtained.

EXAMPLE 14

20 g of the fluorescent whitening agent of the formula

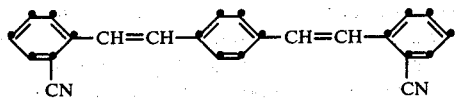

in powder form, 20 g of the humectant of Example 1, 57 g of water and 3 g of a block polymer as used in Example 1 are processed to a slurry which is dispersed and ground for 7 hours with glass beads in a Dyno mill until all the particles of the fluorescent whitening agent have a diameter of less than 3 μm. The grinding elements are then separated, affording a preparation which is suitable for whitening polyester fibres by the HT exhaust method or pad-heat method. In contrast to analogous formulations which contain conventional humectants such as propylene glycol or ethylene glycol instead of the humectant used in Example 1, the above formulation can be completely redispersed with water after dehydration, i.e. it can be brought to the original degree of dispersion with a particle size of 3 μm. On the other hand, the preparations containing propylene glycol or ethylene glycol are irreversibly agglomerated, resulting in a pronounced diminution of the white effect.

EXAMPLE 15

46 g of the dried dye of the formula

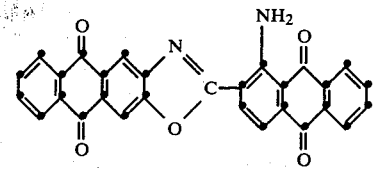

are added to a solution of 3.5 g of an anionic dispersant (condensation product of formaldehyde with a sodium salt of naphthalenesulfonic acid), 38 g of the sodium salt of polyacrylic acid (mol. wt. 8000), 2 g of a 30% formaldehyde solution, 10 g of betaine base monohydrate, 0.4 g of xanthan gum (mol. wt. >1 million), 36 g of the humectant of Example 1 and 64.1 g of water, and homogenised therein. The resultant suspension is dispersed in a wet grinding mill with 400 g of silicon quartz beads (diameter 3 mm) for 8 hours and ground to a maximum particle size of 1 μm. The liquid, finely dispersed vat preparation obtained after separation of the grinding elements is suitable for the pad-steam dyeing of cellulose. It has good storage stability and can be readily redispersed with water to the original maximum particle size of 1 μm after dehydration.

EXAMPLE 16

40.5 g of the dye of the formula

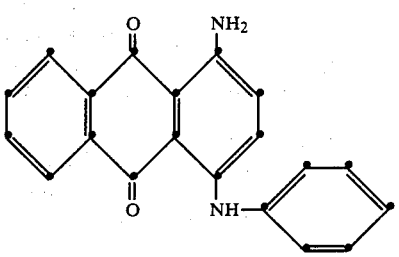

23.95 g of water, 20 g of the humectant of Example 1, 4 g of a block polymer of propylene oxide and ethylene oxide used in Example 1, 1.25 g of sodium dihexylsulfosuccinate (80% solution in alcohol), and 0.3 g of chloroacetamide are finely ground for 24 hours in a bead mill. 10 g of water are added and the dispersion is then separated from the beads. In the redispersibility test of Example 3, the preparation leaves no residue on the filter paper.

This preparation is particularly suitable for transfer printing and in this case e.g. strongly colored prints on polyester fabric are obtained.

COMPARISON TEST

The procedure of Example 16 is repeated, except that the humectant is replaced by the same amount of propylene glycol. In the redispersibility test of Example 16, the formulation can no longer be readily redispersed and leaves many specks on the filter paper.

EXAMPLE 17

6.5 g of the dye of the formula

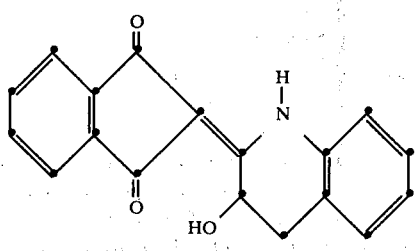

15.5 g of the dye of the formula 9.1 g of the dye of the formula

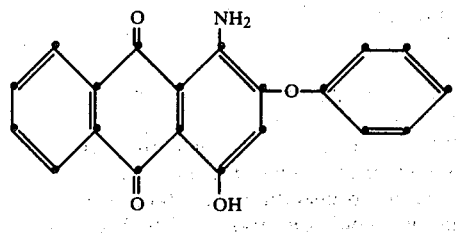

and 7.2 g of the dye of the formula

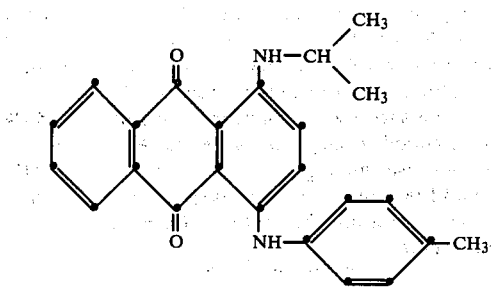

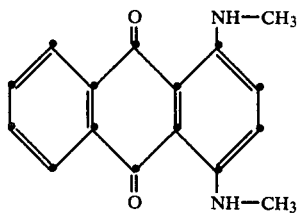

4.8 g of a block polymer of propylene oxide and ethylene oxide as used in Example 1, 0.1 g of a lignosulfonate, 19.3 g of the humectant of Example 1, 0.4 g of a cyclohexanone/formaldehyde condensation product, 0.7 g of formalin, 0.3 g of chloroacetamide and 26 g of water are finely ground for 24 hours in a bead mill. 10 g of water are then added and the resultant fine dispersion is then separated from the beads. This formulation, which is particularly suitable for transfer printing, is storage stable and readily dispersible after dehydration.

By using the same amount of propylene glycol instead of the humectant of Example 1, the resultant formulation also has very good storage stability but can no longer be readily redispersed after dehydration.

EXAMPLE 18

38.6 g of the dye of the formula

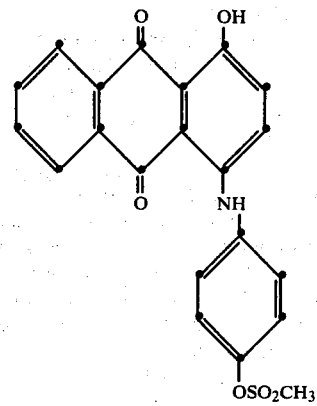

3 g of a block polymer of propylene oxide and ethylene oxide as used in Example 1, 1.6 g of a lignosulfonate, 20.5 g of water and 36 g of a humectant (50%) of the formula

| | in which R can be: |
|---|---|
| 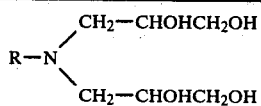 | (a) $CH_3-(CH_2)_2-$ |
| | (b) 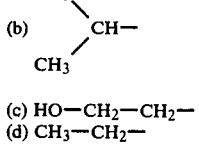 |
| | (c) $HO-CH_2-CH_2-$ |
| | (d) $CH_3-CH_2-$ | are ground for 18 hours in a mill with 200 g of glass beads (diameter 1 mm) to a particle size of about 1 to 4 μm. Then 0.3 g of chloroacetamide is added and grinding is continued for 1 hour. The fine dispersion obtained is then separated from the glass beads.

This preparation is particularly suitable for direct printing and in this case e.g. a strongly colored and speck-free print on polyester fabric is obtained.

The redispersibility test described in Example 3 is carried out. Each of the preparations containing one of the humectants (a) to (d) has good redispersibility.

What is claimed is:

1. A liquid dyestuff preparation comprising water, a water-insoluble or sparingly water-soluble dye, a disperstant, a humectant, and optionally further additives, wherein said humectant is a compound of the formula I

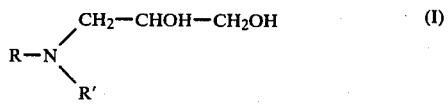

wherein R is a $C_1-C_{16}$alkyl group which is unsubstituted or substituted by OH, CN, halogen or $-N(C_1-C_4alkyl)_2$, and R' is hydrogen or the $-CH_2-CHOH-CH_2OH$ group.

2. A dyestuff preparation according to claim 1, wherein the humectant is a compound of the formula I in which R is an unsubstituted alkyl group of 1 to 8 carbon atoms, and in which R' is the —CH₂—CHOH—CH₂OH group.

3. The dyestuff preparation of claim 2, wherein R is an unsubstituted alkyl group of 2 to 4 carbon atoms.

4. A dyestuff preparation according to claim 1, which comprises 15 to 60% by weight of dye, 20 to 60% by weight of water, 10 to 50% by weight of humectant of the formula I, 0.5 to 10% by weight of dispersant and 0 to 20% by weight of further additives.

5. A dyestuff preparation according to claim 4 which comprises 15 to 60% by weight of dye, 20 to 60% by weight of water, 10 to 50% by weight of the humectant of formula I, 0.1 to 5% by weight of an anionic dispersant, 0.5 to 5% by weight of a non-ionic copolymer of ethylene oxide and a further olefin oxide containing at least 65% by weight of ethylene oxide and having a molecular weight of more than 12000.

6. The dyestuff preparation of claim 5, wherein the weight of dye is 35 to 50% and the weight of humectant is 15 to 30%.

7. A dyestuff preparation according to claim 4, which comprises 15 to 60% by weight of dye, 20 to 60% by weight of water, 10 to 50% by weight of the humectant of formula I, 0.5 to 5% by weight of a non-ionic dispersant, and 0.5 to 5% by weight of an anionic dispersant selected from the group consisting of the (a) dialkylsulfosuccinates, the alkyl moieties of which each contain 3 to 8 carbon atoms, or of the (b) sulfated or sulfonated fatty acids or fatty acid esters of fatty acids containing 10 to 22 carbon atoms 8. The dyestuff preparation of claim 7, wherein the weight of dye is 35 to 50%, the weight of humectant is 15 to 30%, the weight of non-ionic dispersant is 1 to 4% and the weight of anionic dispersant is 1 to 3%.

9. A dyestuff preparation according to claim 7, which contains, as anionic dispersant, 0.5 to 5% by weight of a dialkylsulfosuccinate, the alkyl moieties of which each contain 3 to 8 carbon atoms.

10. The dyestuff preparation of claim 9, wherein weight of dialkylsulfosuccinate is 1 to 3%.

11. A dyestuff preparation according to any one of claims 1 to 9, which contains, as further additives, an extender, a hydrotropic agent, a microbicide, a fungicide, an antifoam or a viscosity improver.

12. A process for the production of an aqueous preparation as claimed in any one of claims 1 to 11, which process comprises mixing and grinding the dye in water with the addition of at least one dispersant, and adding the remaining components before, during or after the grinding operation.

* * * * *